United States Patent
van Wagensveld et al.

(10) Patent No.: US 10,590,358 B2
(45) Date of Patent: Mar. 17, 2020

(54) TWO-STAGE ABSORPTION FOR ACID GAS AND MERCAPTAN REMOVAL

(71) Applicant: Fluor Technologies Corporation, Sugar Land, TX (US)

(72) Inventors: Steven van Wagensveld, Aliso Viejo, CA (US); Curt Graham, Mission Viejo, CA (US); Dave Schulte, Anaheim, CA (US); Bryant Lynch, Rancho Santa Margarita, CA (US)

(73) Assignee: Fluor Technologies Corporation, Sugar Land, TX (US)

(*) Notice: Subject to any disclaimer, the term of this patent is extended or adjusted under 35 U.S.C. 154(b) by 0 days.

(21) Appl. No.: 16/437,539

(22) Filed: Jun. 11, 2019

(65) Prior Publication Data

US 2019/0292474 A1 Sep. 26, 2019

Related U.S. Application Data

(62) Division of application No. 15/468,976, filed on Mar. 24, 2017, now Pat. No. 10,358,614.

(Continued)

(51) Int. Cl.
  *C10L 3/10* (2006.01)
  *B01D 53/14* (2006.01)
  *B01D 53/48* (2006.01)

(52) U.S. Cl.
  CPC .......... *C10L 3/104* (2013.01); *B01D 53/1462* (2013.01); *B01D 53/1487* (2013.01);
  (Continued)

(58) Field of Classification Search
  None
  See application file for complete search history.

(56) References Cited

U.S. PATENT DOCUMENTS 3,234,712 A * 2/1966 Lovett .................. C07C 7/11
                                                  95/166
3,567,381 A * 3/1971 Roszkowski et al. .... C01B 3/52
                                                  423/650

(Continued)

FOREIGN PATENT DOCUMENTS

CA    3047703 A1    8/2018
WO    2008086265 A1    7/2008
(Continued)

OTHER PUBLICATIONS

Van Wagensveld, Steven et al., "Two Stage Absorption for Acid Gas and Mercaptan Removal," filed Feb. 9, 2017, U.S. Appl. No. 62/457,015.

(Continued)

*Primary Examiner* — Tam M Nguyen
(74) *Attorney, Agent, or Firm* — Conley Rose, PC (57) ABSTRACT

A system for processing a gas stream can include an acid gas removal unit comprising a first absorber unit, a compressor, and a second absorber unit. The first absorber unit is configured to receive a feed gas stream containing organic sulfur species and acid gas components, remove at least a portion of the organic sulfur species and acid gas components using a semi-rich solvent at a first pressure, produce a semi-treated gas stream, and produce a rich solvent stream. The compressor unit is configured to compress the semi-treated gas stream from the first pressure to a higher second pressure. The second absorber unit is configured to receive the compressed semi-treated gas stream, remove at least a portion of any organic sulfur species and acid gas components present in the compressed semi-treated gas stream using a lean solvent, produce the semi-rich solvent stream, and produce a treated gas stream.

20 Claims, 4 Drawing Sheets

Related U.S. Application Data (60) Provisional application No. 62/457,015, filed on Feb. 9, 2017.

(52) U.S. Cl.
CPC .............. *B01D 53/48* (2013.01); *C10L 3/103* (2013.01); *C10L 3/106* (2013.01); *B01D 2252/20478* (2013.01); *B01D 2253/116* (2013.01); *B01D 2256/24* (2013.01); *B01D 2257/304* (2013.01); *B01D 2257/306* (2013.01); *B01D 2257/504* (2013.01); *B01D 2257/80* (2013.01); *C10L 2290/541* (2013.01)

(56) References Cited

U.S. PATENT DOCUMENTS

| | | | |
|---|---|---|---|
| 4,242,108 A | 12/1980 | Nicholas et al. | |
| 4,883,515 A * | 11/1989 | Mehra | B01D 53/1487 62/625 |
| 6,090,356 A * | 7/2000 | Jahnke | C01B 3/52 252/373 |
| 7,442,233 B2 * | 10/2008 | Mitariten | B01D 53/0462 423/228 |
| 7,811,361 B2 * | 10/2010 | Lechnick | B01D 53/1462 95/172 |
| 7,879,135 B2 * | 2/2011 | Ravikumar | B01D 53/1462 423/228 |
| 8,480,982 B2 * | 7/2013 | Mak | B01D 53/1406 422/630 |
| 9,671,162 B2 * | 6/2017 | Mak | F25J 3/0209 |
| 9,731,243 B2 * | 8/2017 | Wen | B01D 53/1406 |
| 10,358,614 B2 | 7/2019 | van Wagensveld et al. | |
| 2006/0150812 A1 | 7/2006 | Mak et al. | |
| 2007/0006729 A1 * | 1/2007 | Mitariten | B01D 53/0462 95/92 |
| 2010/0132554 A1 * | 6/2010 | Huang | B01D 53/1425 95/227 |
| 2014/0114110 A1 * | 4/2014 | Mak | F25J 3/0209 585/802 |
| 2014/0357926 A1 * | 12/2014 | Doong | C07C 7/005 585/802 |
| 2015/0005564 A1 * | 1/2015 | Tanna | C10L 3/103 585/823 |
| 2016/0001218 A1 * | 1/2016 | Rota | B01D 53/047 585/822 |

FOREIGN PATENT DOCUMENTS

| | | |
|---|---|---|
| WO | 2012121727 A1 | 9/2012 |
| WO | 2018147883 A1 | 8/2018 |

OTHER PUBLICATIONS

International Search Report & Written Opinion dated Nov. 9, 2017, International Application No. PCT/US2017/024108 filed Mar. 24, 2017.
International Preliminary Report on Patentability dated Aug. 22, 2019, International Application No. PCT/US2017/024108 filed Mar. 24, 2017.
Restriction Requirement dated Nov. 30, 2017, U.S. Appl. No. 15/468,976, filed Mar. 24, 2017.
Office Action dated May 17, 2018, U.S. Appl. No. 15/468,976, filed Mar. 24, 2017.
Final Office Action dated Nov. 29, 2018, U.S. Appl. No. 15/468,976, filed Mar. 24, 2017.
Notice of Allowance dated Mar. 11, 2019, U.S. Appl. No. 15/468,976, filed Mar. 24, 2017.

* cited by examiner

TWO-STAGE ABSORPTION FOR ACID GAS AND MERCAPTAN REMOVAL

CROSS-REFERENCE TO RELATED APPLICATIONS

This application is a divisional of U.S. patent application Ser. No. 15/468,976 filed on Mar. 24, 2017, which claims priority to U.S. Provisional Patent Application Ser. No. 62/457,015 filed on Feb. 9, 2017, both of which are incorporated herein by reference.

BACKGROUND

Many NGL Recovery systems may include the removal of acid gases from high pressure feed gasses that have high $CO_2$ and $H_2S$ content, the production of a pipeline quality gas, and the production of a high $H_2S$ content stream that can be processed by a sulfur plant. In addition to removing acid gases from the high pressure feed gasses, organic sulfur compounds, such as mercaptans, may also be removed from the high pressure feed gasses.

SUMMARY

In an embodiment, a method for processing a gas stream may comprise compressing a semi-treated gas stream, wherein the semi-treated gas stream comprises organic sulfur species and acid gas components; contacting the semi-treated gas stream with a lean solvent; removing at least a portion of the organic sulfur species and acid gas components from the semi-treated gas stream to produce a treated gas stream and a semi-rich solvent stream based on contacting the lean solvent, wherein the semi-rich solvent stream comprises the solvent and the removed organic sulfur species and acid gas components; contacting a feed gas stream with the semi-rich solvent, wherein the feed gas stream comprises organic sulfur species and acid gas components; and removing at least a portion of the organic sulfur species and acid gas components from the feed gas stream to produce the semi-treated gas stream based on contacting the semi-rich solvent with the feed gas stream.

In an embodiment, a system for processing a gas stream may comprise an acid gas removal unit comprising: a first absorber unit configured to receive a feed gas stream containing organic sulfur species and acid gas components, remove at least a portion of the organic sulfur species and acid gas components using a semi-rich solvent, produce a semi-treated gas stream, and produce a rich solvent stream; a compressor unit configured to compress the semi-treated gas stream from the first absorber and produce a compressed semi-treated gas stream; a second absorber unit configured to receive the compressed semi-treated gas stream, remove at least a portion of any organic sulfur species and acid gas components present in the compressed semi-treated gas stream using a lean solvent, produce the semi-rich solvent stream, and produce a treated gas stream; and a regeneration unit configured to receive the rich solvent stream, remove acid gas components from the rich solvent stream, and produce the lean solvent stream.

In an embodiment, an acid gas removal unit may comprise a first absorber unit configured to receive a feed gas stream containing organic sulfur species and acid gas components, remove at least a portion of the organic sulfur species and acid gas components using a semi-rich solvent, produce a semi-treated gas stream, and produce a rich solvent stream; a compressor unit configured to compress the semi-treated gas stream from the first absorber and produce a compressed semi-treated gas stream; a second absorber unit configured to receive the compressed semi-treated gas stream, remove at least a portion of any organic sulfur species and acid gas components present in the compressed semi-treated gas stream using a lean solvent, produce the semi-rich solvent stream, and produce a treated gas stream; and a regeneration unit configured to receive the rich solvent stream, remove acid gas components from the rich solvent stream, and produce the lean solvent stream.

BRIEF DESCRIPTION OF THE DRAWINGS

For a more complete understanding of the present disclosure, reference is now made to the following brief description, taken in connection with the accompanying drawing and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include methods and systems for increasing the removal of mercaptans from the feed gas of an NGL Recovery system. Alkanolamines are commonly used as chemical solvents to remove acid gases from hydrocarbon feed gas streams. Acid gasses may include Hydrogen Sulfide ($H_2S$) and Carbon Dioxide ($CO_2$). This is achieved by contacting the feed gas with the alkanolamine solvent in an absorber column. Many sour feed gases also contain organic sulfur species called mercaptans. In most instances, the mercaptans must also be removed from the feed gas stream in order to meet sales gas and NGL total sulfur specifications.

Figure 1:
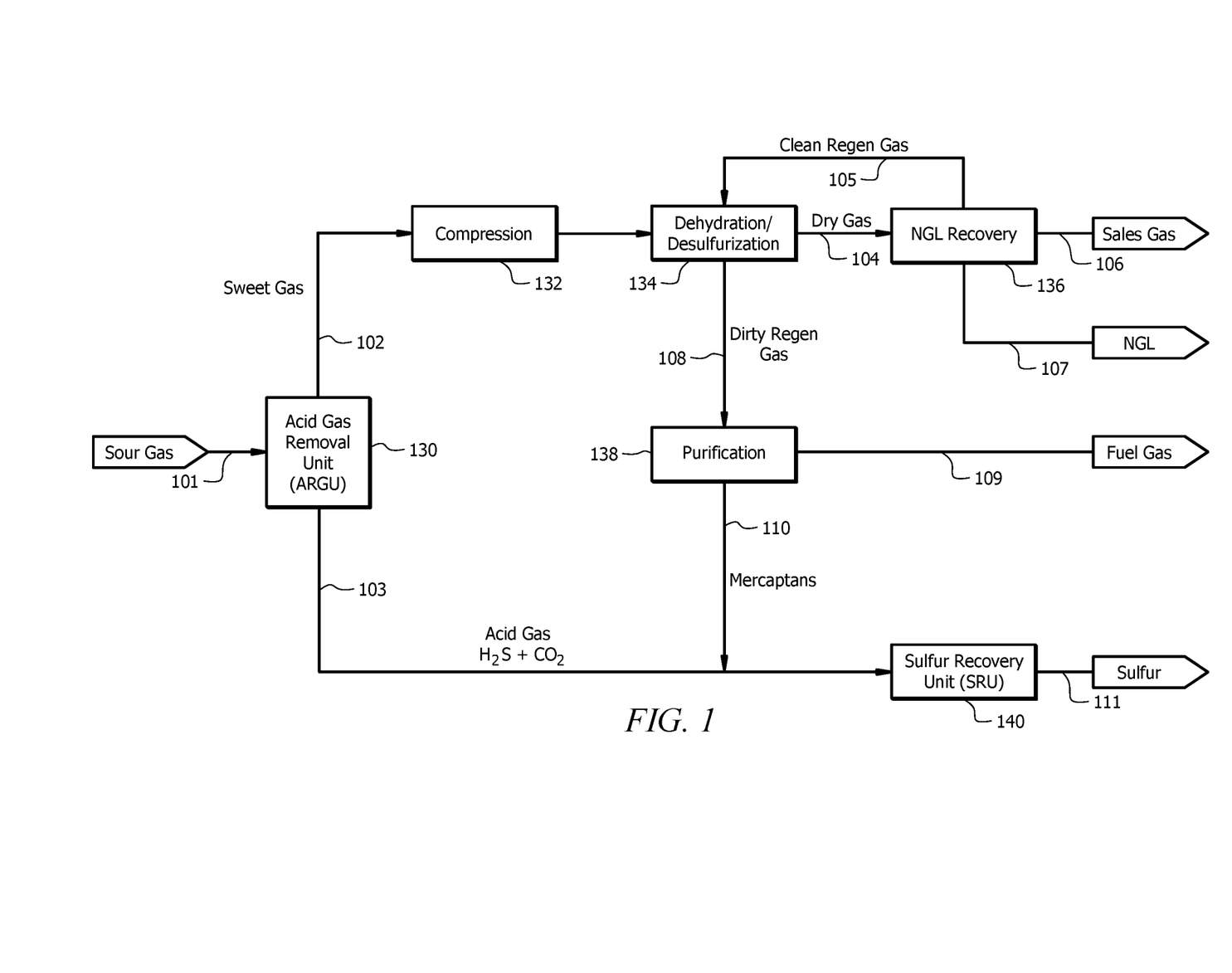
FIG. 1 illustrates a typical process flow diagram according to an embodiment of the disclosure.

In relatively low pressure absorption systems, amines do not remove a significant amount of the mercaptans from the feed gas. Molecular sieves are required downstream of the gas treatment unit for bulk mercaptan removal. Molecular sieves and their auxiliary units (e.g. regeneration gas treatment) are both capital cost and operating cost intensive. Operating experience has shown that as the absorption pressure increases, the mercaptan removal efficiency improves as long as the amine circulation is high enough and there are enough trays in the absorber. However, increasing the absorber pressure is not without drawbacks. Since many feed gases that contain appreciable levels of mercaptans also contain high concentrations of $H_2S$, increasing the absorber pressure increases the partial pressure of $H_2S$ in the feed gas and may require the use of a compressor in a very sour application. The higher $H_2S$ partial pressure and increased number of leak points inevitably results in more stringent health, safety, and environment (HSE) design requirements and operating and maintenance procedures, which can greatly increase the cost of the system. Because of this, treating of very sour gases is typically performed at low pressure to mitigate the risks. The sweet gas is then compressed to the pressure required for Natural Gas Liquids (NGL) Recovery. FIG. 1 shows the typical line-up of units required to process a feed gas with high levels of $H_2S$ and organic sulfur contaminants.

As shown in FIG. 1, a sour gas feed 101 may be processed by an Acid Gas Removal Unit (AGRU) 130. The AGRU 130 may produce a sweet gas stream 102 and an acid gas stream 103. The sweet gas stream 102 may be sent to a compression unit 132 and a dehydration/desulfurization unit 134. The dehydration/desulfurization unit 134 may produce a dry gas stream 104 that may be fed to an NGL Recovery unit 136. The NGL Recovery unit 136 may produce a sales gas stream 106, an NGL stream 107, as well as a clean regeneration gas stream 105. The clean regeneration gas stream 105 may be recycled to the dehydration/desulfurization unit 134. The dehydration/desulfurization unit 134 may also produce a dirty regeneration gas stream 108, which may be fed to a purification unit 138. The purification unit 138 may produce a fuel gas stream 109 and a mercaptans stream 110. The mercaptans stream 110 may be combined with the acid gas stream 103 and fed to a sulfur recovery unit (SRU) 140, where the SRU 140 may produce a recovered sulfur stream 111.

Figure 2:
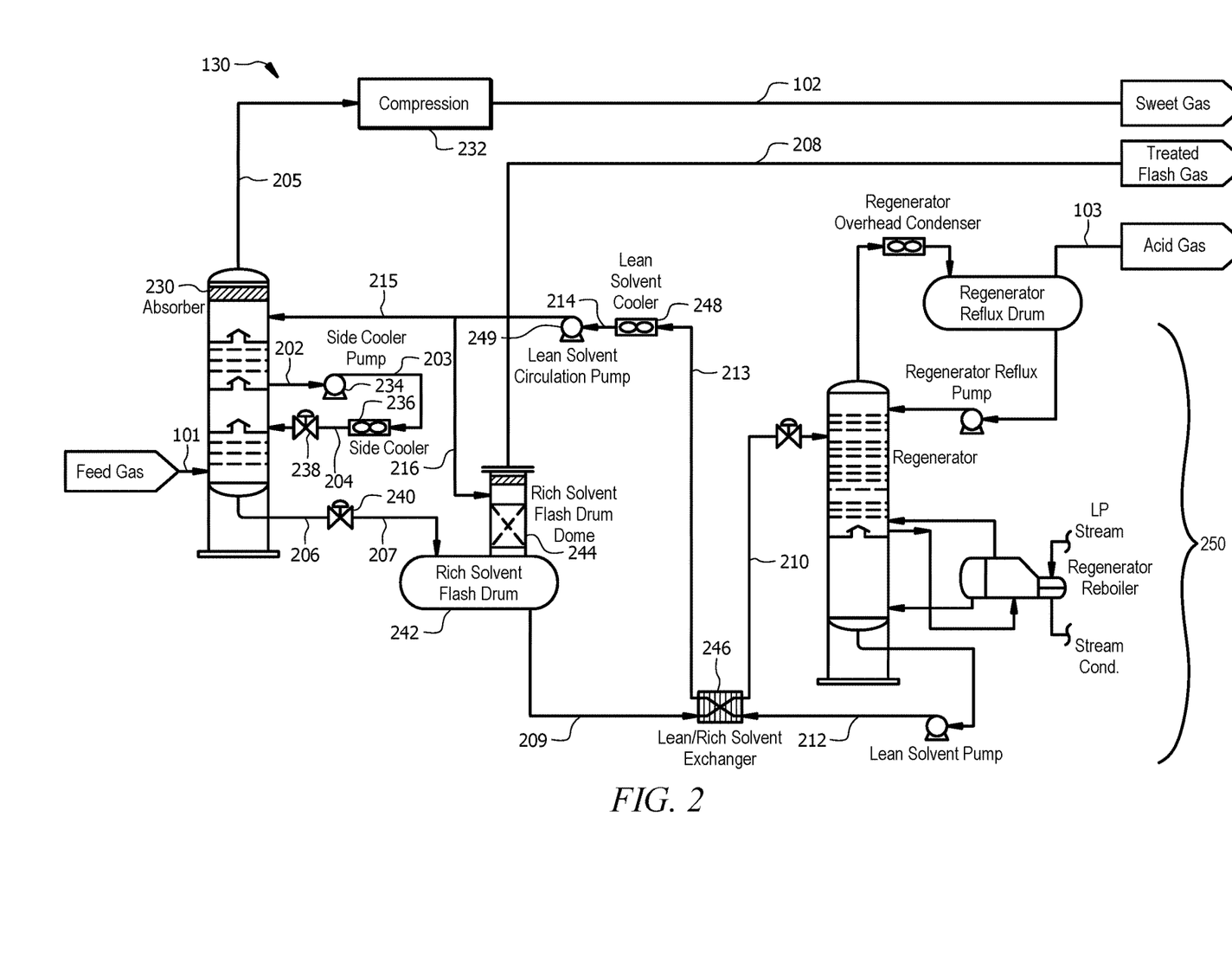
FIG. 2 illustrates a detailed view of a typical process flow diagram according to an embodiment of the disclosure.

FIG. 2 illustrates a flowchart that shows the general configuration of a typical AGRU process for a very sour gas. The AGRU process may be similar to the AGRU process 130 described in FIG. 1. In the configuration shown in FIG. 2, the feed gas 101 is fed to the Absorber 230 where it is contacted counter-currently with a lean solvent stream 215 to remove the acid gas. The treated feed gas 205 from the top of the Absorber 230 is compressed by a compression unit 232, and the compressed sweet gas stream 102 is sent to downstream units for further processing (as described in FIG. 1). The rich solvent stream 206 containing the $H_2S$ and $CO_2$ removed from the feed gas 101 leaves the bottom of the Absorber 230. A side draw of liquid 202 from the Absorber 230 is moved by a pump 234 (creating a pumped stream 203) through the Absorber Side Cooler 236 to remove the heat of absorption. The entire cooled stream 204 is returned back to the Absorber 230 via a control valve 238. The rich solvent—206 from the Absorber 230 is flashed across a control valve 240 to a lower pressure in order to remove most of the hydrocarbons entrained and/or absorbed in the solvent. This flashed stream 207 is sent to the Rich Solvent Flash Drum 242 for separation. Since some $H_2S$ and $CO_2$ are flashed as well, the Rich Solvent Flash Drum 242 has a dome 244 in which the flashed gas is contacted counter-currently with a lean solvent stream 216. The treated flash gas 208 leaves the top of the dome and may be routed to either the facility fuel gas system or is recycled back to the front of the process, depending on the desired acid gas content in the treated flash gas 208.

The rich solvent from the Rich Solvent Flash Drum Dome 244 combines with the rich solvent from the flashed stream 207 and is routed to the solvent regeneration system 250 as a combined stream 209. The stream 209 may be fed to a heat exchanger 246 to produce a heated stream 210 that is fed to the solvent regeneration system 250. Additionally, the regenerated (lean) solvent stream 212 returning from the solvent regeneration system 250 may be cooled via the heat exchanger 246 to produce a cooled lean solvent stream 213, and the cooled lean solvent stream 213 may be further cooled in the Lean Solvent Cooler 248. Then, the cooled stream 214 is moved by a pump 249 producing a first lean solvent stream 215 to the Absorber 230 and a second lean solvent stream 216 to the Rich Solvent Flash Drum Dome 244 for acid gas removal. The solvent regeneration system 250 may comprise a typical system known to those of skill in the art. The solvent regeneration system 250 may produce an acid gas stream 103 which may be sent to downstream units for further processing (as described in FIG. 1).

Figure 3:
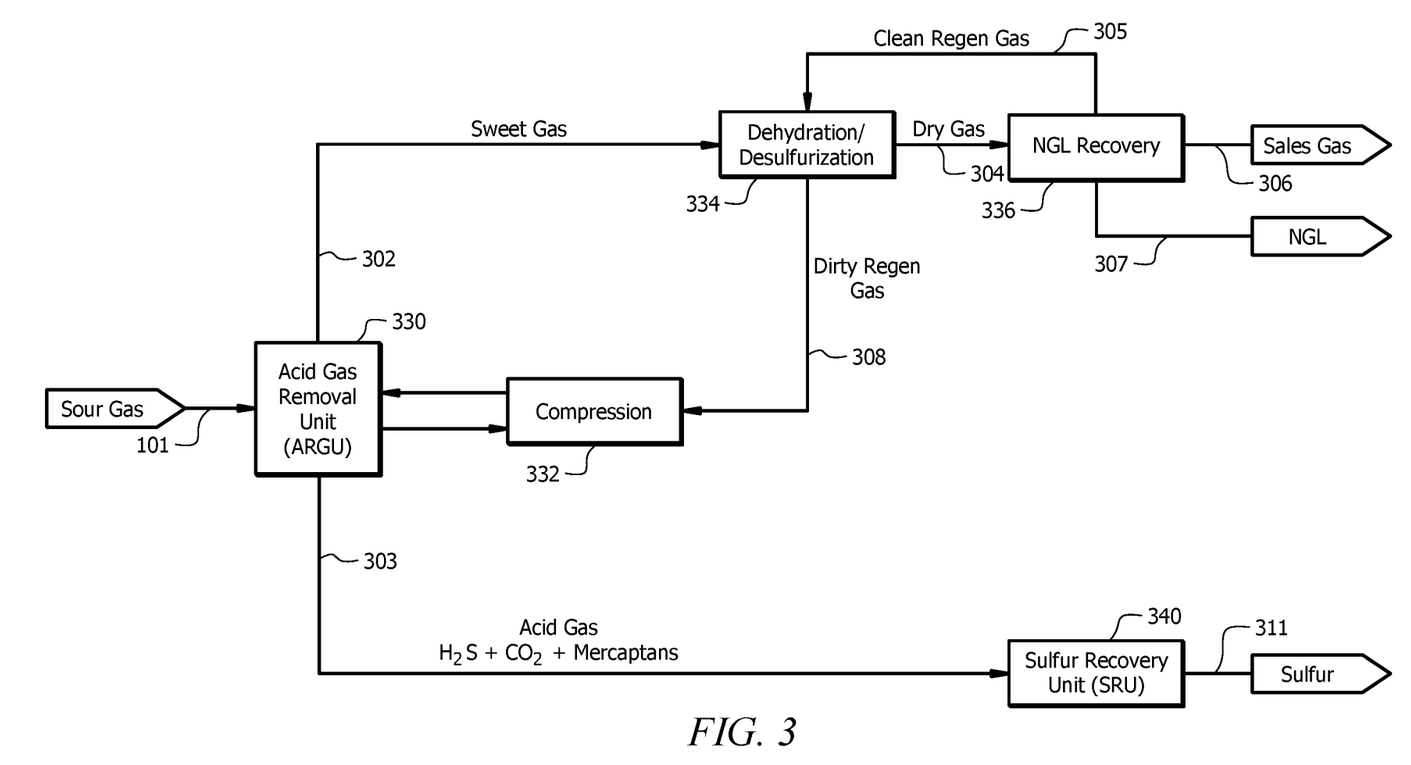
FIG. 3 illustrates a process flow diagram according to an embodiment of the disclosure.

To improve mercaptan removal at higher pressures, a two-stage absorption process may be applied to the AGRU process. The two-stage process may be implemented in a way that maintains the HSE advantages of the low pressure absorption configuration. The improved mercaptan removal may not completely eliminate the need for downstream molecular sieve mercaptan removal in all scenarios, but it may significantly reduce the size of the molecular sieve required for mercaptan removal. Due to the reduction in required molecular sieve capacity, the auxiliary regeneration gas treatment facilities may either be eliminated and/or reduced in size, which may provide significant cost savings for the overall facility. FIG. 3 shows an improved line-up made possible through the use of the two-stage AGRU process, which is shown in more detail in FIG. 4.

Referring to FIG. 3, a sour gas feed 101 may be processed by an Acid Gas Removal Unit (AGRU) 330. The AGRU 330 may produce a sweet gas stream 302 and an acid gas stream 303, where the acid gas stream 303 also contains Mercaptans. The acid gas stream 303 may be fed to a sulfur recovery unit (SRU) 340, where the SRU 340 may produce a recovered sulfur stream 311.

The sweet gas stream 302 may be sent to a dehydration/desulfurization unit 334. The dehydration/desulfurization unit 334 may produce a dry gas stream 304 that may be fed to an NGL Recovery unit 336. The NGL Recovery unit 336 may produce a sales gas stream 306, an NGL stream 307, as well as a clean regeneration gas stream 305. The clean regeneration gas stream 305 may be recycled to the dehydration/desulfurization unit 334. The dehydration/desulfurization unit 334 may also produce a dirty regeneration gas stream 308, which may be fed to a compression unit 332 and recycled back into the AGRU 330.

Figure 4:
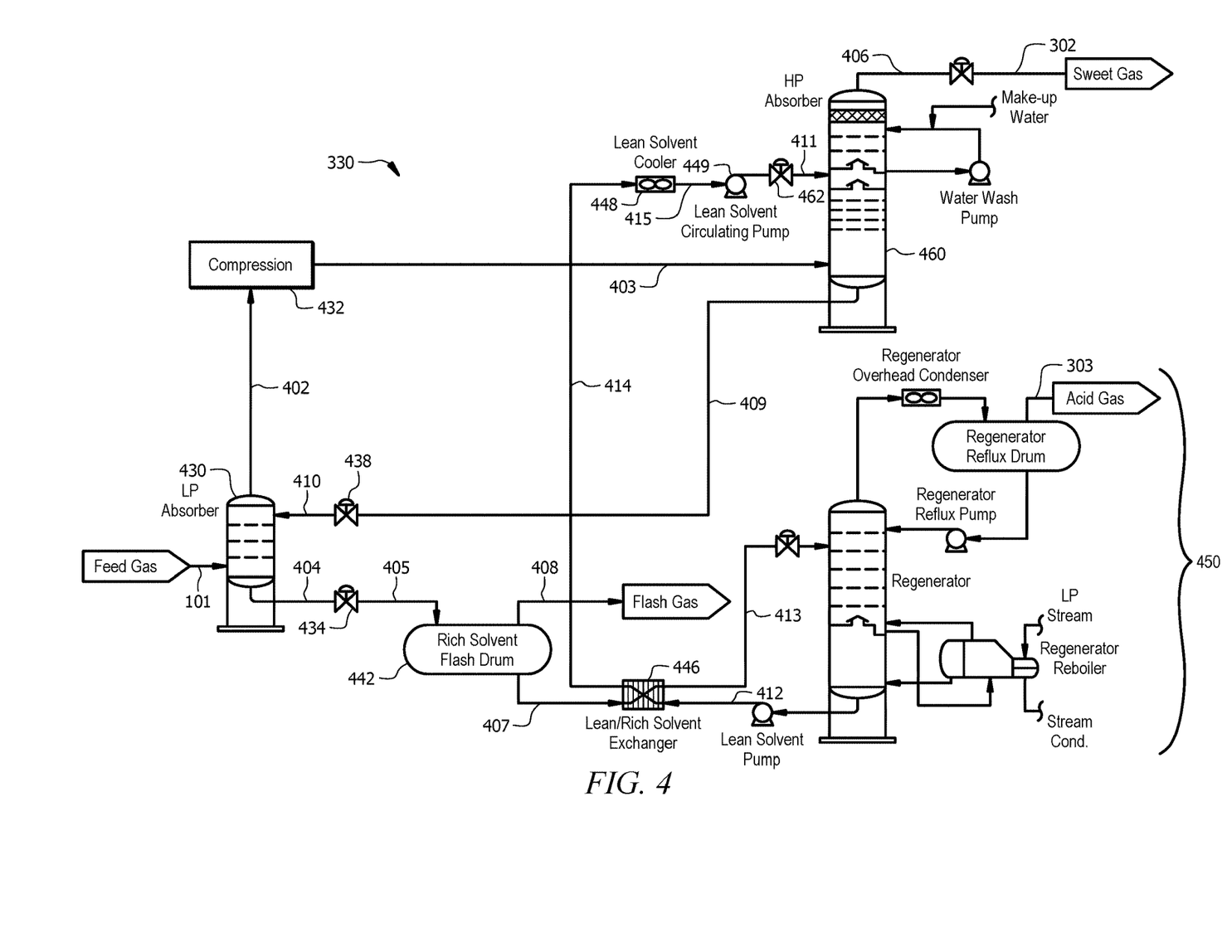
FIG. 4 illustrates a detailed view of a process flow diagram according to an embodiment of the disclosure.

FIG. 4 illustrates a flowchart that shows the general configuration of a two-step absorption AGRU process 330. The process can be applied for any relatively low pressure feed gas 101 that contains mercaptans that must be removed. The process includes two stages of absorption. The first stage is at feed gas pressure for bulk removal of the $H_2S$. This enables compression of the semi-treated gas at still relatively low $H_2S$ partial pressures. The second stage is at higher pressure to achieve treated gas specification.

In the configuration shown in FIG. 4, the feed gas 101 is fed to the Low Pressure (LP) Absorber 430 where it is contacted counter-currently with a semi-rich solvent stream 410 from the High Pressure (HP) Absorber 460 to remove the majority of the acid gas. The level of acid gas removal in the LP Absorber 430 depends on the operating pressure of the HP Absorber 460 and HSE requirements. The semi-treated gas leaves 402 the top of the LP Absorber 430 and is sent to the Semi-Treated Gas Compression Train 432. Once the semi-treated gas is compressed 403, it is fed to the HP Absorber 460 where it is contacted counter-currently with a lean solvent 411 from the solvent regeneration system 450. The lean solvent 411 removes the remaining $H_2S$ and $CO_2$ in the semi-treated gas 403 along with a significant amount of the mercaptans. The treated gas 406 leaves the top of the HP Absorber 460 and is controlled to produce the sweet gas stream 302 for further processing. The semi-rich solvent 409 from the bottom of the HP Absorber 460 is flashed across a control valve 438 and then routed as the semi-rich solvent stream 410 to the LP Absorber 430. The rich solvent stream 404 from the LP Absorber 430 contains $H_2S$, $CO_2$, and mercaptans removed from the feed gas 101. The rich solvent stream 404 is flashed across a control valve 434 to a lower pressure of the stream 405 in order to remove most of the hydrocarbons entrained and/or absorbed in the solvent. This flashed stream 405 is sent to the Rich Solvent Flash Drum 442 for separation. The flash gas 408 is sent to Off-gas Compression so it can be recycled back to the front of the process.

The rich solvent 407 from the Rich Solvent Flash Drum 442 may be fed to a heat exchanger 446 to produce a heated stream 413 that is fed to the solvent regeneration system 450. Additionally, the regenerated (lean) solvent stream 412 returning from the solvent regeneration system 450 may be cooled via the heat exchanger 446 to produce a cooled lean solvent stream 414, and the cooled lean solvent stream 414 may be further cooled in the Lean Solvent Cooler 448. Then, the cooled stream 415 is moved by a pump 449 via a control valve 462 as the lean solvent 411 to the HP Absorber column 460 for acid gas and mercaptan removal.

TABLE 1

Absorption System Comparison
Absorption System Comparison

| | | Sweet Gas | |
|---|---|---|---|
| Component | Feed Gas | Single Stage Absorption | Two Stage Absorption |
| $H_2S$ | 2755 kmol/hr | 0.00 kmol/hr | 0.00 kmol/hr |
| $CO_2$ | 1190 kmol/hr | 0.01 kmol/hr | 0.00 kmol/hr |
| Methyl Mercaptan | 1.31 kmol/hr | 0.69 kmol/hr | 0.01 kmol/hr |
| Ethyl Mercaptan | 0.51 kmol/hr | 0.45 kmol/hr | 0.42 kmol/hr |
| Total Mercaptans | 1.99 kmol/hr | 1.28 kmol/hr | 0.57 kmol/hr |

The above Table 1 shows simulation results for a comparison between a low pressure, single stage absorption system (as described in FIGS. 1 and 2) and a two-stage absorption system (as described in FIGS. 3 and 4). The data is based on a feed gas that contains approximately 22 mol % $H_2S$, 10 mol % $CO_2$, 100 ppm mol methyl mercaptan, 40 ppm mol ethyl mercaptan, and 160 ppm mol total mercaptans. The feed gas enters the system at 20 barg and 35° C. For the single stage process, the Absorber operates at roughly 20 barg. For the two-stage process, the LP Absorber operates at roughly 20 barg and the HP Absorber operates at roughly 70 barg. The Absorber in the single stage process has 23 trays. In the two-stage process, the LP Absorber has 5 trays, and the HP Absorber has 18 trays, for a total of 23 trays. The lean solvent concentration is 55 wt % and the solvent circulation rate is the same for both scenarios. The lean solvent temperature is 58° C. for both scenarios, which may be typical for air-cooled solvent. The selected conditions (temperatures, pressures and feed composition) are to support the analysis of the invention. These conditions do not reflect a limitation to the conditions under which the invention is applicable.

Table 1 shows that the single stage process results in 47% methyl mercaptan removal, 12% ethyl mercaptan removal, and 36% total mercaptan removal. The two-stage process results in over 99% methyl mercaptan removal, 18% ethyl mercaptan removal, and 71% total mercaptan removal. These simulation results indicate that the two-stage system provides a significant advantage in methyl mercaptan removal, which leads to roughly twice the total mercaptan removal from the feed gas. However, operating experience for single stage, high pressure absorption systems show that ethyl and heavier mercaptans exhibit higher removal efficiencies than indicated in the simulation results. This further supports the notion that a two-stage system has appreciable mercaptan removal capabilities compared to a single stage, low pressure system.

The two-stage system shifts the compression step to the semi-treated gas to take advantage of improved mercaptan removal in the HP Absorber. Compression of the sweet gas is no longer needed as it is at sufficient pressure for NGL recovery. The two-stage system does require two absorber columns, but when compared to a single-stage system, the total number of trays may be roughly the same. Additionally, in some instances the HP Absorber can be a smaller diameter than the LP Absorber due to the increased pressure and the bulk removal of $H_2S$ and $CO_2$ in the LP Absorber.

Advantages of the two-stage system include improved mercaptan removal compared to a low pressure absorption system, reduction in size of (or possibly elimination of) mercaptan removal molecular sieves in downstream processes, possible elimination of downstream regeneration gas treatment units, and maintenance of the HSE design advantages of a low pressure absorption system. Systems in the future may have more very-sour-gas developments. Most of these developments may include mercaptans in the feed gas that must be removed to meet product specifications.

In a first embodiment, a method for processing a gas stream may comprise compressing a semi-treated gas stream, wherein the semi-treated gas stream comprises organic sulfur species and acid gas components; contacting the semi-treated gas stream with a lean solvent; removing at least a portion of the organic sulfur species and acid gas components from the semi-treated gas stream to produce a treated gas stream and a semi-rich solvent stream based on contacting the lean solvent, wherein the semi-rich solvent stream comprises the solvent and the removed organic sulfur species and acid gas components; contacting a feed gas stream with the semi-rich solvent, wherein the feed gas stream comprises organic sulfur species and acid gas components; and removing at least a portion of the organic sulfur species and acid gas components from the feed gas stream to produce the semi-treated gas stream based on contacting the semi-rich solvent with the feed gas stream.

A second embodiment can include the method of the first embodiment, wherein contacting the semi-treated gas stream with the lean solvent occurs at a higher pressure than contacting the feed gas stream with the semi-rich solvent.

A third embodiment can include the method of the first or second embodiments, further comprising liquefying at least a portion of the treated gas stream after contacting the treated gas stream with the lean solvent and the semi-rich solvent.

A fourth embodiment can include the method of the third embodiment, wherein the gas stream further comprises water.

A fifth embodiment can include the method of the fourth embodiment, wherein the method further comprises removing at least a portion of the water in the treated gas stream prior to liquefying at least the portion of the treated gas stream.

A sixth embodiment can include the method of any of the first to fifth embodiments, further comprising producing a rich solvent stream containing the solvent and the removed organic sulfur species and acid gas components.

A seventh embodiment can include the method of any of the first to sixth embodiments, further comprising stripping the organic sulfur species and acid gas components from the rich solvent stream to produce the lean solvent stream.

An eighth embodiment can include the method of any of the first to seventh embodiments, further comprising regenerating the rich solvent to produce the lean solvent.

A ninth embodiment can include the method of any of the first to eighth embodiments, wherein the organic sulfur species comprise a mercaptan.

A tenth embodiment can include the method of any of the first to ninth embodiments, wherein the acid gas components comprise $H_2S$.

An eleventh embodiment can include the method of any of the first to tenth embodiments, wherein the acid gas components comprise $CO_2$.

A twelfth embodiment can include the method of any of the first to eleventh embodiments, wherein contacting the semi-treated gas stream with the lean solvent occurs at a pressure between about 20 barg and about 150 barg.

A thirteenth embodiment can include the method of any of the first to twelfth embodiments, wherein contacting the feed gas stream with the semi-rich solvent occurs at a pressure between about 2 barg and about 80 barg.

In a fourteenth embodiment, a system for processing a gas stream may comprise an acid gas removal unit comprising: a first absorber unit configured to receive a feed gas stream containing organic sulfur species and acid gas components, remove at least a portion of the organic sulfur species and acid gas components using a semi-rich solvent, produce a semi-treated gas stream, and produce a rich solvent stream; a compressor unit configured to compress the semi-treated gas stream from the first absorber and produce a compressed semi-treated gas stream; a second absorber unit configured to receive the compressed semi-treated gas stream, remove at least a portion of any organic sulfur species and acid gas components present in the compressed semi-treated gas stream using a lean solvent, produce the semi-rich solvent stream, and produce a treated gas stream; and a regeneration unit configured to receive the rich solvent stream, remove acid gas components from the rich solvent stream, and produce the lean solvent stream.

A fifteenth embodiment can include the system of the fourteenth embodiment, further comprising a NGL recovery unit downstream of the acid gas removal unit, wherein the NGL recovery unit is configured to receive the treated gas stream and liquefy at least a portion of the hydrocarbons in the treated gas stream.

A sixteenth embodiment can include the system of the fourteenth or fifteenth embodiments, further comprising a dehydration unit downstream of the acid gas removal unit and upstream of the NGL recovery unit, wherein the dehydration unit is configured to receive the treated gas stream and remove at least a portion of the water present in the treated gas stream prior to the cleaned gas stream passing to the NGL recovery unit.

A seventeenth embodiment can include the system of any of the fourteenth to sixteenth embodiments, further comprising a pressure reduction device configured to receive the semi-rich solvent stream from the second absorber and reduce the pressure of the semi-rich solvent stream prior to the semi-rich solvent stream being received by the first absorber.

In an eighteenth embodiment, an acid gas removal unit may comprise a first absorber unit configured to receive a feed gas stream containing organic sulfur species and acid gas components, remove at least a portion of the organic sulfur species and acid gas components using a semi-rich solvent, produce a semi-treated gas stream, and produce a rich solvent stream; a compressor unit configured to compress the semi-treated gas stream from the first absorber and produce a compressed semi-treated gas stream; a second absorber unit configured to receive the compressed semi-treated gas stream, remove at least a portion of any organic sulfur species and acid gas components present in the compressed semi-treated gas stream using a lean solvent, produce the semi-rich solvent stream, and produce a treated gas stream; and a regeneration unit configured to receive the rich solvent stream, remove acid gas components from the rich solvent stream, and produce the lean solvent stream.

A nineteenth embodiment can include the acid gas removal unit of the eighteenth embodiment, wherein the organic sulfur species comprise a mercaptan.

A twentieth embodiment can include the acid gas removal unit of the eighteenth or nineteenth embodiments, wherein the second absorber unit is configured to remove at least a portion of any organic sulfur species and acid gas components present in the compressed semi-treated gas stream at a higher pressure than the pressure at which the first absorber unit is configured to remove at least a portion of the organic sulfur species and acid gas components.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for processing a gas stream comprising:
an acid gas removal unit comprising:
    a first absorber unit configured to receive a feed gas stream containing organic sulfur species and acid gas components, remove at least a portion of the organic sulfur species and acid gas components using a semi-rich solvent at a first pressure, produce a semi-treated gas stream, and produce a rich solvent stream;
    a compressor unit configured to compress the semi-treated gas stream from the first absorber at the first pressure, and produce a compressed semi-treated gas stream at a second pressure, wherein the second pressure is higher than the first pressure;
    a second absorber unit configured to receive the compressed semi-treated gas stream, remove at least a portion of any organic sulfur species and acid gas components present in the compressed semi-treated gas stream using a lean solvent, produce the semi-rich solvent stream, and produce a treated gas stream;
    a pressure reduction device configured to receive the semi-rich solvent stream from the second absorber, flash the semi-rich solvent stream to provide a low-pressure semi-rich solvent stream, and provide the low-pressure semi-rich solvent stream to the first absorber; and
    a regeneration unit configured to receive the rich solvent stream, remove acid gas components from the rich solvent stream, and produce the lean solvent stream.

2. The system of claim 1, further comprising a NGL recovery unit downstream of the acid gas removal unit.

3. The system of claim 2, wherein the NGL recovery unit is configured to receive the treated gas stream and liquefy at least a portion of the hydrocarbons in the treated gas stream.

4. The system of claim 1, further comprising a dehydration unit downstream of the acid gas removal unit and upstream of the NGL recovery unit.

5. The system of claim 4, wherein the dehydration unit is configured to receive the treated gas stream and remove at least a portion of the water present in the treated gas stream prior to the cleaned gas stream passing to the NGL recovery unit.

6. The system of claim 1, further comprising: the feed gas stream containing the organic sulfur species and acid gas components disposed within the first absorber.

7. The system of claim 1, wherein first pressure is between about 2 barg and about 80 barg.

8. The system of claim 1, wherein the second pressure is between about 20 barg and about 150 barg.

9. The system of claim 6, wherein the organic sulfur species comprise a mercaptan.

10. The system of claim 6, wherein the acid gas components comprise at least one of $H_2S$ or $CO_2$.

11. An acid gas removal unit comprising:
a first absorber unit configured to receive a feed gas stream containing organic sulfur species and acid gas components, remove at least a portion of the organic sulfur species and acid gas components using a semi-rich solvent at a first pressure, produce a semi-treated gas stream, and produce a rich solvent stream;
a compressor unit configured to compress the semi-treated gas stream from the first absorber at the first pressure, and produce a compressed semi-treated gas stream at a second pressure, wherein the second pressure is higher than the first pressure;

a second absorber unit configured to receive the compressed semi-treated gas stream, remove at least a portion of any organic sulfur species and acid gas components present in the compressed semi-treated gas stream using a lean solvent, produce the semi-rich solvent stream, and produce a treated gas stream;

a pressure reduction device configured to receive the semi-rich solvent stream from the second absorber, flash the semi-rich solvent stream to provide a low-pressure semi-rich solvent stream, and provide the low-pressure semi-rich solvent stream to the first absorber; and a regeneration unit configured to receive the rich solvent stream, remove acid gas components from the rich solvent stream, and produce the lean solvent stream.

12. The acid gas removal unit of claim 11, further comprising: the feed gas stream containing the organic sulfur species and acid gas components disposed within the first absorber, wherein the organic sulfur species comprise a mercaptan.

13. The acid gas removal unit of claim 12, wherein the acid gas components comprise at least one of $H_2S$ or $CO_2$.

14. The acid gas removal unit of claim 11, wherein first pressure is between about 2 barg and about 80 barg.

15. The acid gas removal unit of claim 11, wherein the second pressure is between about 20 barg and about 150 barg.

16. The acid gas removal unit of claim 11, further comprising: a NGL recovery unit downstream of the acid gas removal unit.

17. The acid gas removal unit of claim 16, wherein the NGL recovery unit is configured to receive the treated gas stream and liquefy at least a portion of the hydrocarbons in the treated gas stream.

18. The acid gas removal unit of claim 11, further comprising a dehydration unit downstream of the acid gas removal unit and upstream of the NGL recovery unit.

19. The acid gas removal unit of claim 18, wherein the dehydration unit is configured to receive the treated gas stream and remove at least a portion of the water present in the treated gas stream prior to the cleaned gas stream passing to the NGL recovery unit.

20. The acid gas removal unit of claim 12, wherein the feed gas stream contains more than 20 mol % $H_2S$.

* * * * *